(12) United States Patent
Evens (10) Patent No.: US 7,840,544 B2
(45) Date of Patent: Nov. 23, 2010

(54) METHOD FOR STORING UNIVERSAL NETWORK PERFORMANCE AND HISTORICAL DATA

(75) Inventor: Timothy Evens, Austin, TX (US)

(73) Assignee: Cisco Technology, Inc., San Jose, CA (US)

(*) Notice: Subject to any disclaimer, the term of this patent is extended or adjusted under 35 U.S.C. 154(b) by 420 days.

(21) Appl. No.: 11/950,252

(22) Filed: Dec. 4, 2007

(65) Prior Publication Data

US 2009/0144298 A1 Jun. 4, 2009

(51) Int. Cl.
*G06F 7/00* (2006.01)
(52) U.S. Cl. .................... 707/697; 707/758; 710/19; 713/175; 713/600
(58) Field of Classification Search .................... None
See application file for complete search history.

(56) References Cited

U.S. PATENT DOCUMENTS

| | | | |
|---|---|---|---|
| 6,012,063 A * | 1/2000 | Bodnar | 707/697 |
| 2003/0204703 A1* | 10/2003 | Rajagopal et al. | 711/216 |
| 2004/0267798 A1* | 12/2004 | Chatterjee et al. | 707/102 |
| 2006/0064416 A1* | 3/2006 | Sim-Tang | 707/6 |
| 2006/0075004 A1* | 4/2006 | Stakutis et al. | 707/204 |
| 2007/0086134 A1* | 4/2007 | Zweigle et al. | 361/85 |
| 2008/0109568 A1* | 5/2008 | Rengarajan et al. | 710/19 |

* cited by examiner

*Primary Examiner*—Hosain T Alam
*Assistant Examiner*—Jieying Tang
(74) *Attorney, Agent, or Firm*—Patterson & Sheridan, LLP (57) ABSTRACT

One embodiment of the present invention sets forth a method for storing data collected from a network. The method may involve storing collected data only when a change relative to a previous value of the data is detected. For some embodiments, string data may be converted to numeric values, allowing the same change detection mechanisms to be used for both string and numeric values.

18 Claims, 6 Drawing Sheets

300

| DEVICE ID 310 | NAME 312 | TYPE 314 | TIME STAMP 316 | NUMERIC VALUE 308 | STRING VALUE 305 | DELTA* VALUE 304 | DELTA SECONDS 306 | DATA TYPE 307 |
|---|---|---|---|---|---|---|---|---|
| Route 1 | PROCESS | CPU UTIL | 996100 | 20 | | 0 | 0 | GAUGE |
| | | | 996700 | 25 | | 0.008333333 | 600 | GAUGE |
| | | | 998500 | 18 | | -0.003888889 | 1800 | GAUGE |
| | | | 998800 | 20 | | 0.006666667 | 300 | GAUGE |
| | | | 999100 | 30 | | 0.033333333 | 300 | GAUGE |
| | | 420 | 999400 | 28 | | -0.006666667 | 300 | GAUGE |
| | | | 999100 | 40 | | 0.04 | 300 | GAUGE |
| | | | 000000 | 35 | | -0.00555556 | 900 | GAUGE |

*DELTA VALUE = (CURRENT NUMERIC VALUE − PREVIOUS NUMERIC VALUE) / DELTA SECONDS

| 310 | 312 | 314 | 316 | 308 | 305 | 304 | 306 | 307 |
|---|---|---|---|---|---|---|---|---|
| DEVICE ID | NAME | TYPE | TIME STAMP | NUMERIC VALUE | STRING VALUE | DELTA VALUE | DELTA SECONDS | DATA TYPE |
|  |  |  |  |  |  |  |  |  |

PRIMARY KEY ('device id', 'name', 'time')

FIG. 3B

IF DATA TYPE = STRING
   NUMERIC VALUE = CRC (STRING VALUE)

COMMENT: USE CRC OF STRING VALUE TO
             DETECT CHANGE IN STRING VALUE

FIG. 3C

| DEVICE ID 310 | NAME 312 | TYPE 314 | TIME STAMP 316 | NUMERIC VALUE 308 | STRING VALUE 305 | DELTA* VALUE 304 | DELTA SECONDS 306 | DATA TYPE 307 |
|---|---|---|---|---|---|---|---|---|
| Route 1 | PROCESS | CPU UTIL | 996100 | 20 | | 0 | 0 | GAUGE |
| | | | 996700 | 25 | | 0.008333333 | 600 | GAUGE |
| | | | 998500 | 18 | | -0.003888889 | 1800 | GAUGE |
| | | | 998800 | 20 | | 0.006666667 | 300 | GAUGE |
| | | | 999100 | 30 | | 0.033333333 | 300 | GAUGE |
| | | | 999400 | 28 | | -0.006666667 | 300 | GAUGE |
| | | | 999100 000000 | 40 | | 0.04 | 300 | GAUGE |
| | | | | 35 | | -0.00555556 | 900 | GAUGE |

420 (indicating timestamp 999100 000000)

*DELTA VALUE = (CURRENT NUMERIC VALUE - PREVIOUS NUMERIC VALUE) / DELTA SECONDS

METHOD FOR STORING UNIVERSAL NETWORK PERFORMANCE AND HISTORICAL DATA

BACKGROUND OF THE INVENTION

1. Field of the Invention

Embodiments of the present invention generally relate to networks and, more particularly, to storing data collected for a network.

2. Description of the Related Art

Network management systems (NMS) often collect, store, process and report on performance and historical data over time for various devices in a network. In a network with hundreds or thousands of devices, the number of data objects results to collect can easily reach into the 100's of thousands. Thus, one challenge for an NMS is to store a large amount of object results collected every poll interval. For example, if the NMS polled 100,000 objects every 5 minutes and stored the result of each object, the NMS would have to store 28,800,000 records each day, placing a load on NMS resources (e.g., CPU and disk), as well as increasing input/output wait times.

One approach to overcoming the problem of storing such vast amounts of object results involves limiting the polling frequency. Another approach involves implementing dependant complex logic into the polling applications. However, both of these approaches put restrictions on the types of data that may be collected and stored within the NMS, which may result in delayed responses and gaps in the data collected.

As the foregoing illustrates, what is needed in the art is an improved technique for storing data collected from devices in a network.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention allow for efficient storage of data (e.g., network performance and historical data) periodically collected from multiple devices in a network. The amount of data stored may be reduced by storing only data that has changed since a last poll for data. Only storing data that has changed may significantly reduce the amount of storage required, particularly for data that does not change every poll interval.

For some embodiments, the determination of whether or not data has changed may be efficiently performed during a store operation, for example, when inserting a record into a database. Upon detecting that there has been no change to the data in the record (e.g., by comparing the current value to the last value), the record may be simply discarded. In this fashion, a "data manager" of the NMS may only add new records to the DB table when the values collected from the objects in the network change, which significantly reduces the total number of records stored. As a result, database size, CPU, and disk utilization may all be reduced.

For some embodiments, a uniform data structure (e.g., database table) may be utilized that allows for the efficient storage of data of a wide variety of types. In such a data structure, string data may be converted to numeric data, allowing the same change detection algorithm to be applied to different types of data. In this manner, the current values and the delta values are stored in the DB table in a numeric form, independent on the type of data collected from the objects.

An Exemplary Network Architecture

Figure 1:
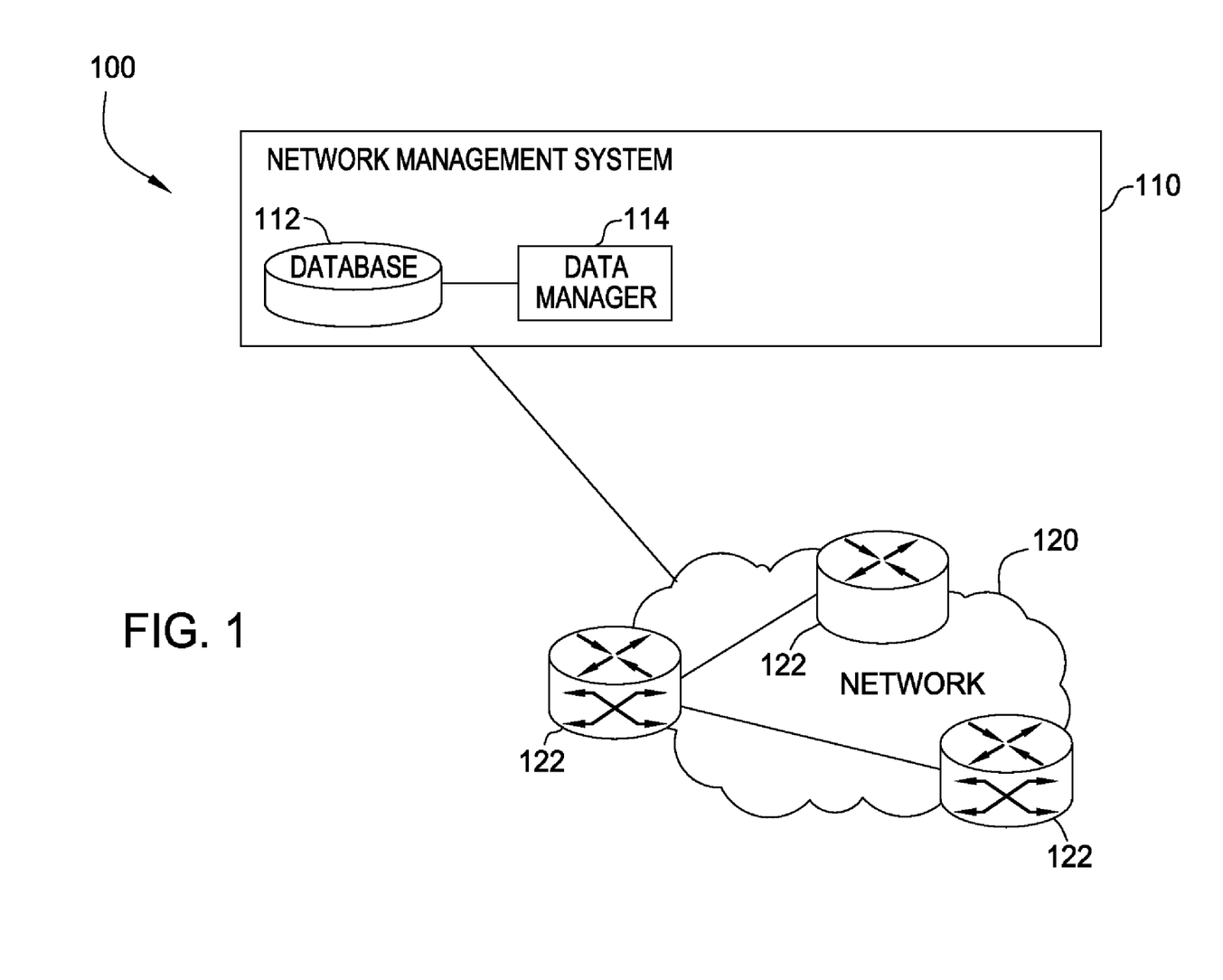
FIG. 1 illustrates an example network topology in accordance with embodiments of the present invention.

FIG. 1 illustrates an example network topology in which embodiments of the present invention may be utilized. As shown, a network management system (NMS) 110 is connected to a network 120 that includes various network devices 122. The NMS 110 may be implemented, for example, at a network operation center (NOC), and may communicate with agents deployed in the network 120 in an effort to help track network performance and the general health of network resources.

The NMS 110 may be configured to collect and store data including a number of parameters for each of the network devices 122. The NMS 110 includes, without limitation, a database 112 and a data manager 114. The data manager 114 may be configured to perform a number of the operations described herein (e.g., collect data from the various network devices 122, process the data, and store the results in a database table within the database 112). While the following description will refer to storing collected data in a database, those skilled in the art will recognize that the other types of data structures, such as linked arrays may also be used to store collected data. The techniques described herein may be applied to limit the amount of data stored, regardless of the particular type of data structure used to store the data.

The data manager 114 may further be configured to display current and historical information related to the network performance. The data manager 114 may have a graphical user interface (GUI), not shown in FIG. 1, which may be used to generate and display reports for presenting the collected and stored data. As will be described in greater detail below, although records may only be stored for changed data, leaving gaps in the records for times data is not changed, the data manager 114 may be able to fill in these gaps when generating reports, based on the raw values, delta values, and stored difference in time between changes (e.g., delta seconds) stored in the records.

Storing the Data in the Database

Figure 2:
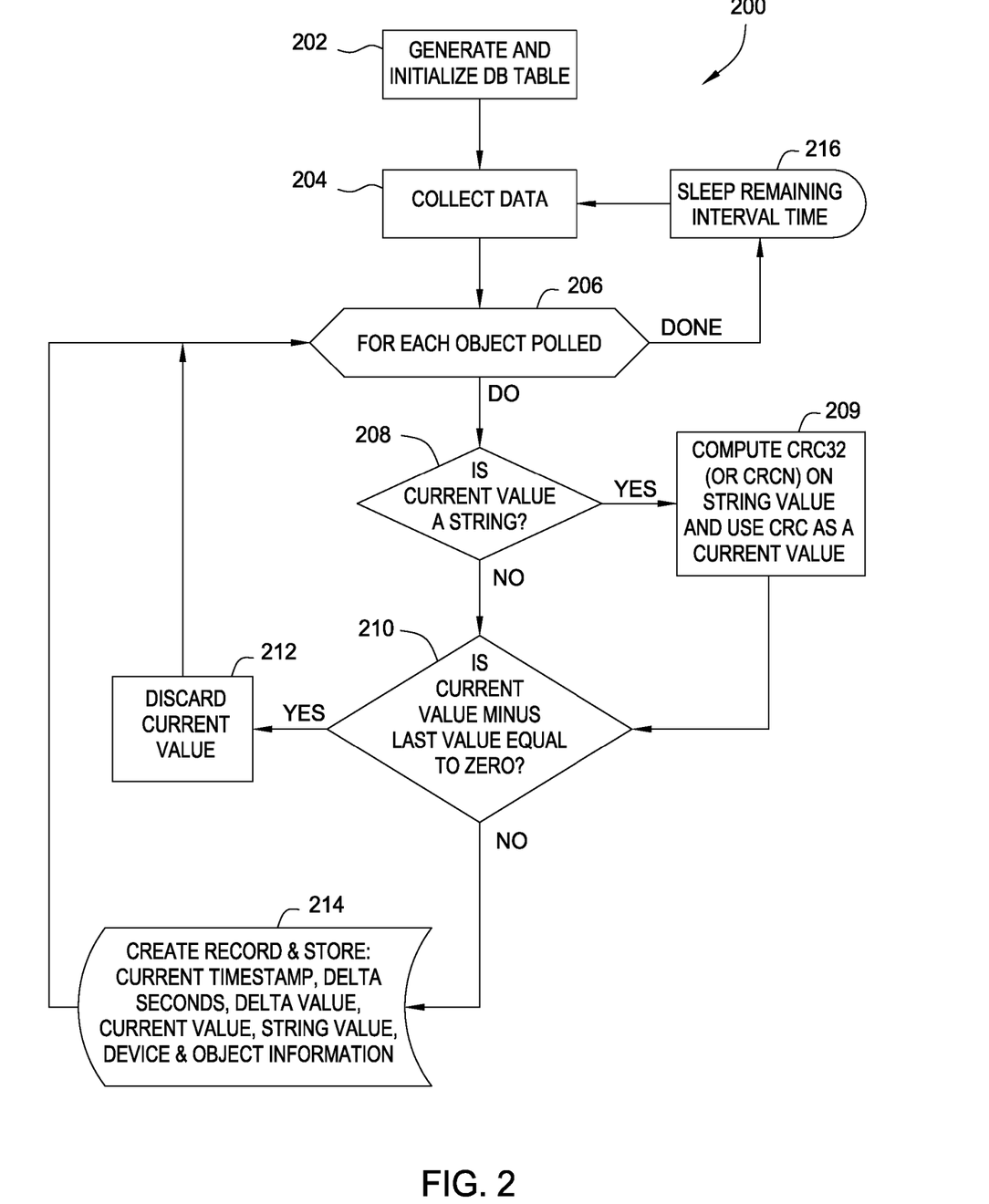
FIG. 2 is a flow diagram of example operations for processing data from multiple network device objects within a network, in accordance with embodiments of the present invention.

FIG. 2 is a flow diagram of example operations 200 for efficiently storing data collected for a network, in accordance with embodiments of the present invention. The method steps may be described with reference to FIGS. 3A-3C, which illustrate an example database table that may be used to store collected data, corresponding structures and functions.

Figure 3A:
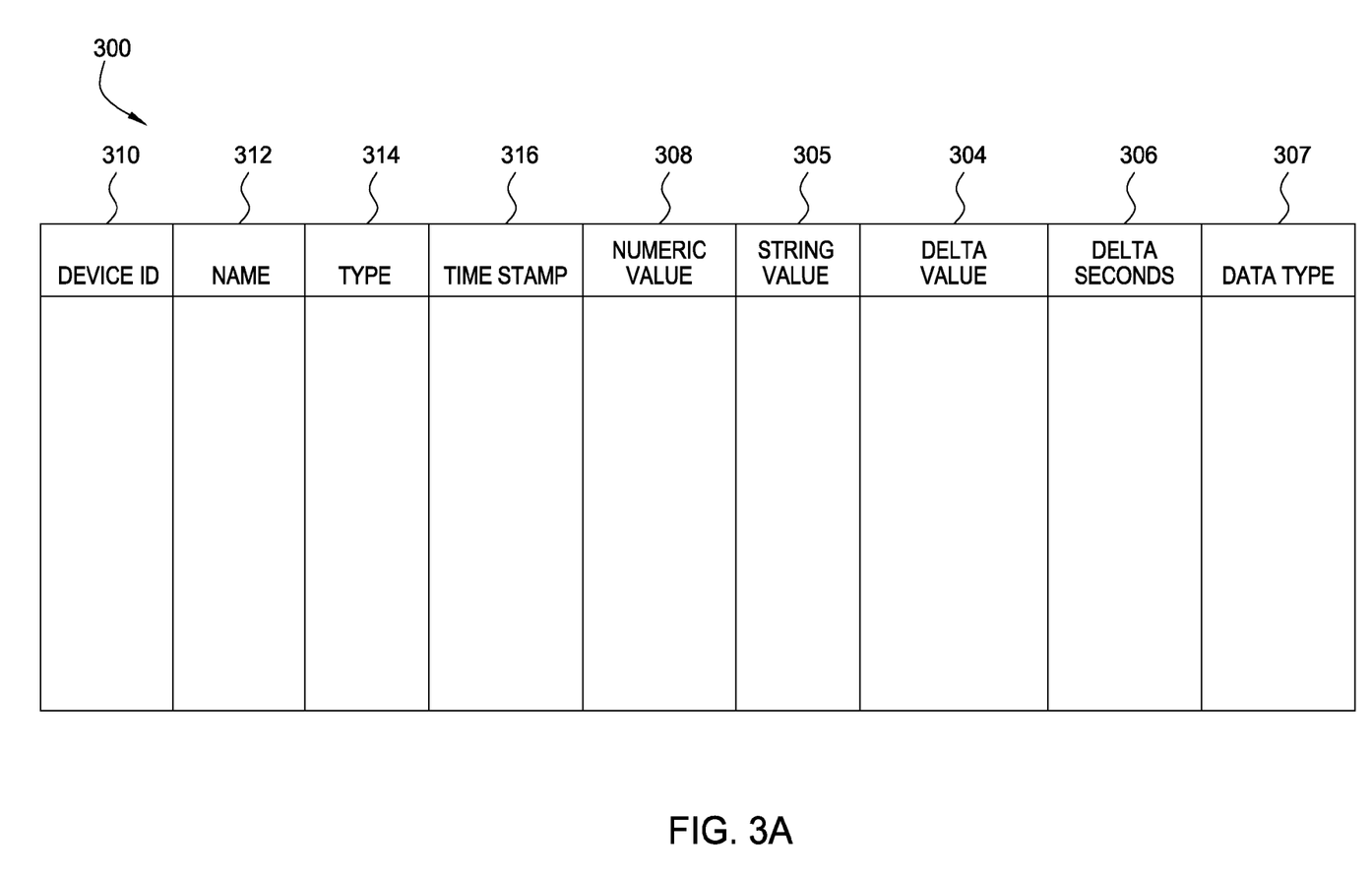
FIGS. 3A-3C illustrate an example database table, primary key designation, and numeric transformation of string value, in accordance with embodiments of the present invention.

The operations 200 begin, at step 202, where the data manager 114 generates and initializes a database table. The database table may be stored in the database 112. FIG. 3A illustrates an example database (DB) table 300, in accordance with embodiments of the present invention. The DB table 300 is configured to provide universal storage for data collected from devices in the network, regardless of data type.

As illustrated, for each data object collected, the DB table 300 may include a device ID field 310, name 312, and type 314. The device ID may be a unique identifier of the network device from which the data was collected (e.g., a router GUID), while the name and type may specify the type of data collected (e.g., a port name FastEthernet0/0 and a corresponding parameter, such as SNMP OID, RTT, or jitter).

Figure 3B:
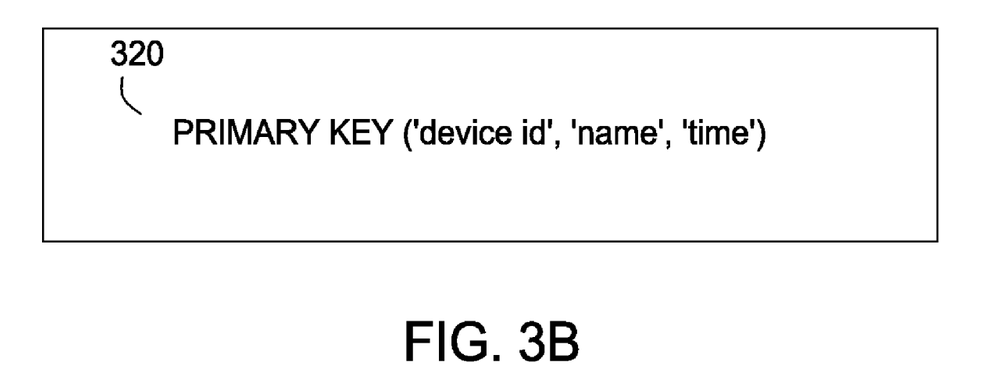

As illustrated in FIG. 3B, each individual record corresponding to that data object may be uniquely identified by a primary key 320 formed by the device id, name, type. Particular values for a given sample interval for which a record is stored (e.g., the data has changed), may be retrieved using the primary key and a corresponding timestamp 316.

Each of the collected parameters may be related to a variety of different types of data, such as a counter, gauge, or a string. For each of the objects, the data type specified in the field TYPE 307 may determine how that data is stored. For example, for some embodiments, counter and gauge data types may be stored as numeric values in a Numeric Value field 308.

Figure 3C:
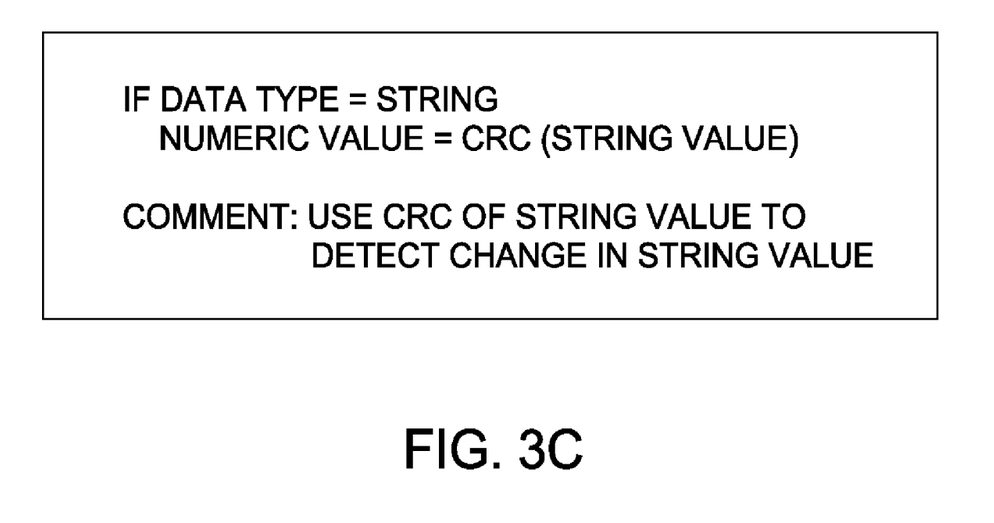

String data types, on the other hand, may be stored in a String Value field 305. Examples of string data may include configuration data (including operating system versions) retrieved for a router, command line history, access control lists (ACLs) and the like. To maintain uniformity in detecting changes to data, however, the string data may be converted into a numeric form (such as a CRC or other type of checksum) and stored in Numeric Value field 316. FIG. 3C illustrates example code that may be used to convert string data to a numeric value for use in detecting changes.

For some large strings, only hash values of those strings may be stored in the String Value field of the DB table. A CRC may be then be calculated on the hash value and stored in the Numeric Value field, with a change in CRC indicating a change in hash value. In this manner, lengthy strings may only be retrieved and stored when necessary (e.g., when triggering an alarm when an ACL or other type router configuration has changed).

After the database is setup, data is collected from the network at step 204. For some embodiments, data may be collected periodically within a specified poll interval. Data for multiple parameters may be collected every poll interval (with a wait period 216 between polls), while data for other parameters may be collected more or less frequently, for example, depending on how often it is likely to change.

Starting at step 206, for each of the data object polled, the data manager may begin to process the data. If an object is string data (as determined at step 208), a CRC may be computed for the string data, at step 209, as described above. If, in step 208, the data manager 114 determines that the current value is not a character string, the method proceeds to step 210.

At step 210, a determination is made as to whether the data has changed since a last poll, for example, by comparing the last value (obtained in a last poll) to the current value (obtained in the current poll). The difference between the last and current value indicates a change. For numeric data types, this "changed value" may actually indicate the amount of change. For string data types, the changed value, if generated as a comparison of checksums, provides a qualitative indication of change which may help decide whether to obtain a rather lengthy actual string value.

For some embodiments, a value indicating how much a polled parameter has changed over a poll interval, referred to herein as a "delta value" may be stored in a record created when data has changed. As will be described in greater detail below, the delta value may allow for the reverse calculation of a previously polled data value, without requiring access to the record containing that value. The delta value may be calculated based on the changed value and the change in time between obtaining the current value and the last value, according to the following formula:

$$\text{delta\_value} = (\text{<current numeric\_value>} - \text{<last numeric\_value>}) / (\text{<current timestamp>} - \text{<last timestamp>})$$

The change in time between polls, referred to herein as "delta seconds," for the current and last numeric value is calculated by subtracting the corresponding timestamps for those polls.

Storing the delta value and delta seconds in a record may facilitate reporting functions. For example, the changed value (relative to a previously polled value) may be calculated even without the previous record by multiplying the delta value by the delta seconds. The previous value may then be calculated by subtracting the changed value from the current numeric value in the current record.

While storing the delta value and delta seconds may facilitate reporting in some case, for some embodiments, the changed value and delta seconds may be stored, allowing the delta value to be derived for later reporting. This amounts in a shift in processing away from the storage systems to the reporting systems. Having the delta value calculated and stored benefits the reporting system so that a value-type counter may be extracted without special calculations.

For some embodiments, the determination of whether or not the data has changed may be performed as part of a store (e.g., DB insert) operation. For example, such operations may include program instructions that compute the delta value and the delta seconds during the insert or use a built-in database INSERT trigger to update the fields DV 304 and DS 306 on insert. Example code for an insert trigger based on a detected change in data is listed below:

```
# Below are variable fields used within this trigger procedure
declare last_val bigint (20) default 0;
declare delta_secs int (10) default 0;
declare changed_val int (10) default 0;
# Below retrieves last record numeric value of same device_id, name, and type
#   It also computes the delta seconds from the current record to the last record
select value,timestampdiff (second, timestamp, current_timestamp)
  into last_val, delta_secs
  from perf_data where device_id = new.device_id and
      name = new.name and type = new.type
```

-continued

```
order by timestamp desc limit 1;
# Below computes the "changed value" and stores in variable changed_val
set changed_val = new.value − last_val;
# Check if we should discard or store changed value, zero means discard
IF changed_val = 0 THEN
   # Setting new record columns to NULL causes database to discard record
   set new.device_id = NULL;
   set new.name = NULL;
   set new.type = NULL;
ELSE
   # Below stores the delta seconds value in the
   #   new record column to be inserted
   set new.delta_secs = delta_secs;
   # Below IF statement checks if seconds is zero or not.
   #   Normally this should always be a positive number, but to be safe
   #   we do not want to divide by zero, which would be invalid.
   #   Therefore, if the "delta_secs" is not zero, compute the actual
   #   delta value by using the formula "<changed value> / <time difference>"
   IF delta_secs > 0 THEN
      set new.delta = changed_val / delta_secs;
   ELSE
      set new.delta = changed_val;
   END IF;
END IF;
```

The code illustrated above for triggering storage of a new record updates the delta value to the value difference from the last value to the current value within the time difference in delta seconds. If the current value is the same as the last value, then the difference is zero and, thus, the current value should be discarded since the current value has not changed. Setting the NULL entries in the record automatically causes discarding of the record when the new record has not changed from the last record.

If the data has not changed, the current value is discarded, at step 212, thus saving the storage and corresponding processing overhead that would have been consumed by unnecessarily storing unchanged data.

If the data has changed, however, a record containing the changed data is stored, at step 214. As illustrated in FIG. 3A, for some embodiments, the record for changed data may include fields for a timestamp (when the data was collected) 316, the current numeric value 308, the string value (used to calculate the numeric value for string data types) 305, the delta value 304, and the data type 307 (e.g., counter, gauge, or string).

As illustrated, a delta seconds field 306 may also be stored with the record. The delta seconds field may be calculated as a difference between the timestamps of the current poll and a previous poll. Storing the delta seconds along with the delta value and current value allows for the derivation (reverse calculation) of numeric values from a previous record, even without the previous record. The following formula may be used to derive the numeric value from a previous record:

<derived previous numeric value>=<current numeric value>−(<delta value>* <delta_seconds>).

Table I illustrates how previous numeric values (from previous records) may

TABLE I

Example Derived Previous Values (10 s sample intervals)

| Current Value | Changed Value | Delta Value | Derived Previous Value |
| --- | --- | --- | --- |
| 100 | 100 | 10.000000 | 0 |
| 150 | 50 | 5.000000 | 100 |

TABLE I-continued

Example Derived Previous Values (10 s sample intervals)

| Current Value | Changed Value | Delta Value | Derived Previous Value |
| --- | --- | --- | --- |
| 50 | −100 | −10.000000 | 150 |
| 100 | 50 | 5.000000 | 50 |
| 200 | 100 | 10.000000 | 100 |
| 230 | 30 | 3.000000 | 200 |
| 500 | 270 | 27.000000 | 230 | be derived from values stored in current records. The example assumes a poll interval of 10s. As illustrated, a numeric value of zero from a previous record (not listed in the table) is derived from the equation above using a current value of 100, delta value of 10 and delta seconds value of 10:

<derived previous numeric value>=100−(10*10)=0

As illustrated, the numeric values of previous records are accurately derived using the values from current records in the list.

Figure 4A:
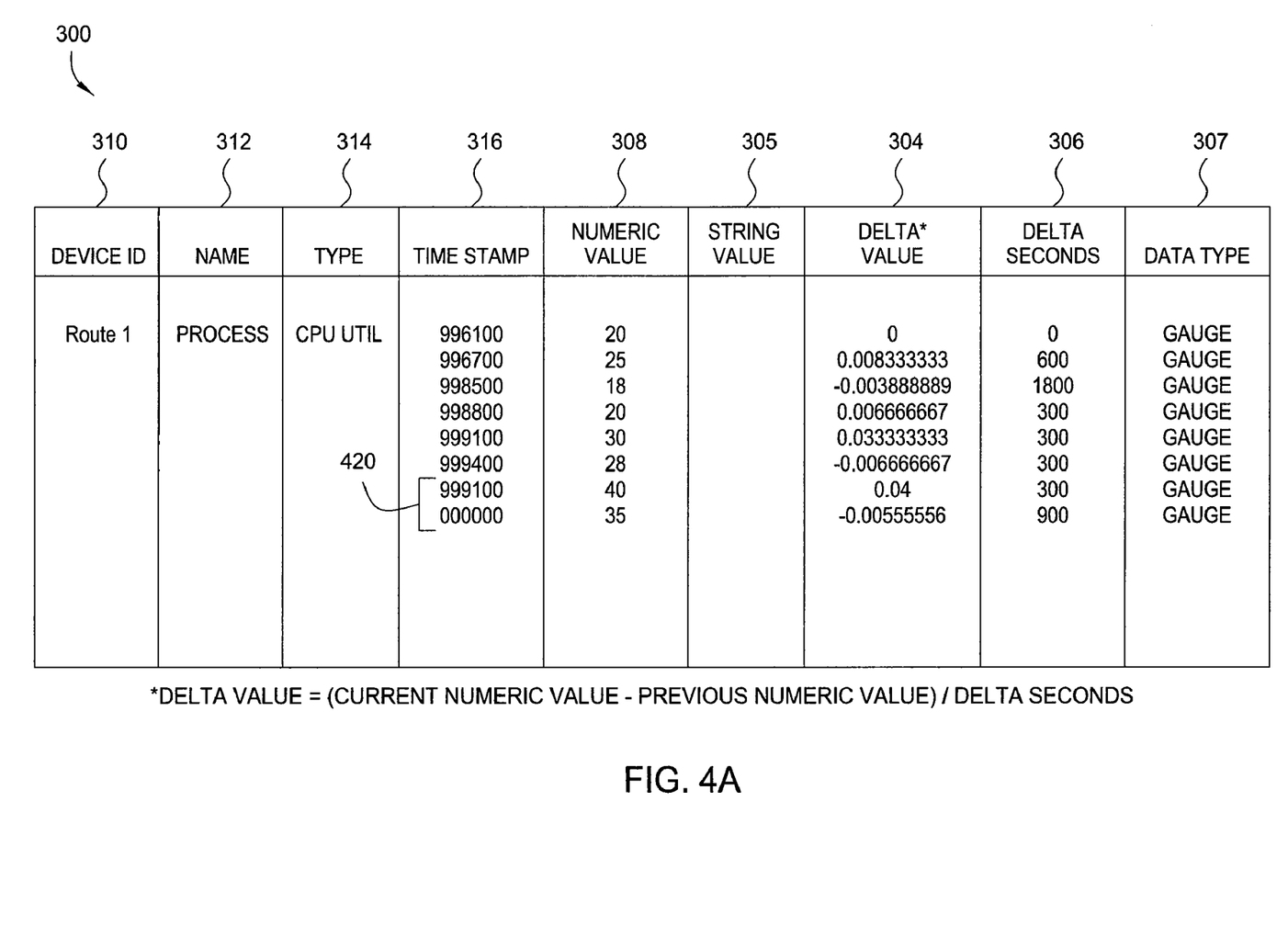
FIGS. 4A and 4B illustrate an example populated database and a corresponding report, in accordance with embodiments of the present invention.
Figure 4B:
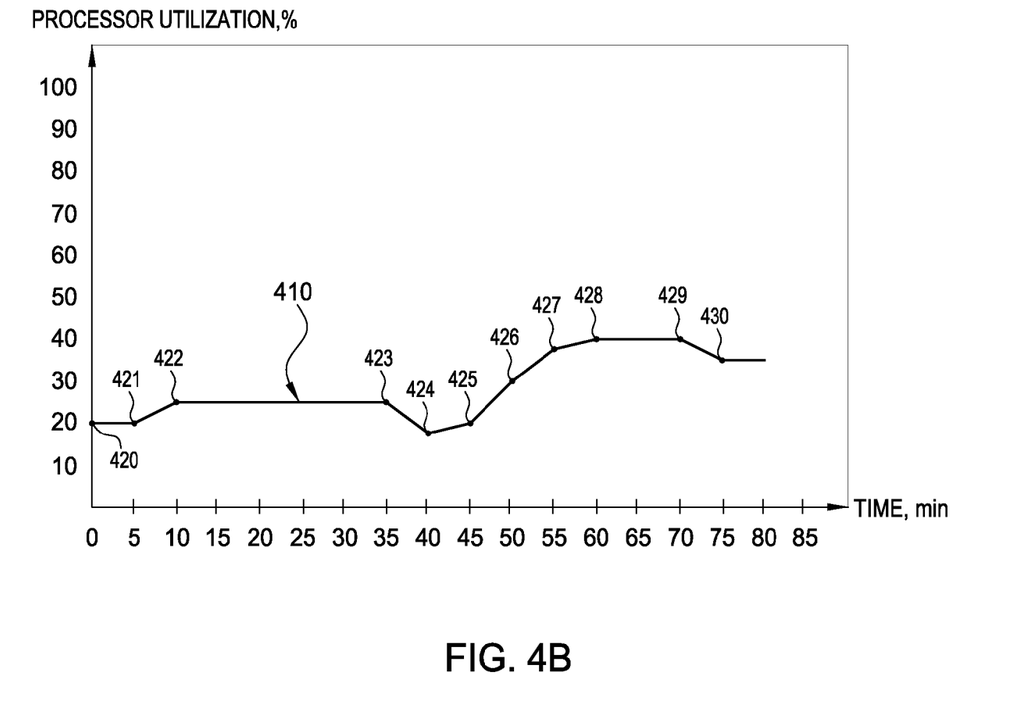

FIGS. 4A and 4B illustrate an example of the database 300 populated with example records and a corresponding report that may be generated therefrom. The example table in FIG. 4A assumes that data for "CPU Utilization" for a router (Device ID=router 1) has been collected over time, utilizing a 5 minute (300 s) polling interval. The example assumes CPU utilization is reported as a percentage between 0 and 100. As previously described, the data type specified in the field TYPE 307 (GAUGE type) determines that raw values are to be put in the Numeric Value field 308 and, thus, these values may be used for reporting.

FIG. 4B illustrates a report generated based on the data stored in the database table 300 for the example network device object of FIG. 4A, in accordance with embodiments of the present invention. A line 410 represents processor utilization, shown in %, at different times, shown in minutes. Point 420 on the line 410 corresponds to the first record for the processor utilization unit 402, where, at time 0, processor utilization is 20%.

As reflected in the table 300, this corresponds to the last value added to field numeric value field. At the end of the next current poll interval, the current value of processor utilization is still 20%. Therefore, since the changed value is zero, no record is made for that poll interval. However, as shown in FIG. 4B, an entry for this interval is still filled in, by using the previously stored (unchanged) value in the table.

At the end of the next poll interval, the current value of processor utilization changes to 25%. Therefore, the changed value is 5 and a record with the current value, delta value, and delta seconds is stored. Similar changes occur in subsequent polls, with the CPU utilization remaining constant at 40 for three poll intervals (15 minutes), before changing to 35 (changed value=−5, delta value=−0.0056, delta seconds=900).

As illustrated, in some cases, a timestamp may reset (e.g., roll over) periodically after reaching a maximum counter value (as shown at 420 between the second and third to last poll intervals). However, utilizing the delta seconds value to track the time between polls for records, the resetting of the raw timestamp value may have no adverse effect on reporting.

As illustrated in FIGS. 4A and 4B, storing only changed data may significantly reduce the number of records stored, while still allowing continuous reporting, even for polls where no record was entered. Therefore, reporting of the results related to the network performance remains accurate, while becoming less complex relative to the prior art approaches. In various implementations, reporting may also include performing more complex reporting functions based on the stored data, such as computing the minimum, the maximum, and the average values of one or more parameters collected from network device objects based on the records stored in the DB table 300.

Further, conventional reporting or network alarms may be triggered, for example, when detecting a change in a configuration string for a device is detected. By detecting changes based on numeric values stored only when changed, such as a checksum calculated for a string (or a checksum calculated on a hash of the string), the need to collect and store lengthy strings may be avoided. For diagnostic purposes, full strings may be collected only when a change is detected.

While the foregoing is directed to embodiments of the present invention, other and further embodiments of the invention may be devised without departing from the basic scope thereof, and the scope thereof is determined by the claims that follow.

What is claimed is:

1. A method of reducing the amount of storage space required to store data gathered from a network, comprising:
   collecting data from one or more devices in a network, the collected data including a current value for at least one parameter for which data was previously collected and stored;
   determining whether the current value of the parameter has changed relative to a previously collected value for the parameter;
   upon determining that the current value of the parameter has not changed, discarding the current value without storing a record; and
   upon determining that the current value of the parameter has changed:
      generating a delta value indicative of how much the parameter has changed over a time period since collecting the previously collected value, wherein the delta value is calculated by dividing a difference between the current value and the previously collected value by an amount of time elapsed since collecting the previously collected value; and
      storing a record including at least the current value and the delta value, storing the current value in a numeric data field of the record if the parameter has a numeric data type, and, if the parameter has a string data type, generating a checksum for the current value of the parameter and storing the checksum in the numeric data field of the record.

2. The method of claim 1, further comprising:
   generating a delta time value based on a difference in timestamps corresponding to the current value and the previously collected value; and
   storing the delta time value in the record.

3. The method of claim 2, further comprising:
   deriving a value of the parameter for an earlier time based on the stored parameter value, stored delta value, and stored delta time value; and
   presenting the derived value in a report that present parameter values at different times.

4. The method of claim 3, further comprising:
   deriving values for the parameter for times with no corresponding records because the parameter value did not change based on stored values for the parameter and stored delta time values in other records.

5. The method of claim 1, wherein the parameter comprises a string value and the method comprises:
   determining whether the current value of the parameter has changed comprises comparing a numeric checksum value calculated based on the current string value of the parameter to a numeric checksum value generated for a previously collected string value of the parameter.

6. The method of claim 5, wherein:
   the data collected from the one or more network devices comprises parameters having string values and parameters having numeric values; and
   the method comprises storing records including current values of parameter having string values and current values of parameters having numeric values in a common database table.

7. A network management system, comprising:
   polling logic for collecting data from one or more devices in a network, the collected data including a current value for at least one parameter for which data was previously collected and stored; and
   storing logic for determining whether the current value of the parameter has changed relative to a previously collected value for the parameter, discarding the current value without storing a record upon determining that the current value of the parameter has not changed, and, upon determining that the current value of the parameter has changed:
      generating a delta value indicative of how much the parameter has changed over a time period since collecting the previously collected value, wherein the delta value is calculated by dividing a difference between the current value and the previously collected value by an amount of time elapsed since collecting the previously collected value; and
      storing a record including at least the current value and the delta value, storing the current value in a numeric data field of the record if the parameter has a numeric data type, and, if the parameter has a string data type, generating a checksum for the current value of the parameter and storing the checksum in the numeric data field of the record.

8. The system of claim 7, wherein the storing logic is configured to determine whether the current value of the parameter has changed as part of database store operation.

9. The system of claim 7, wherein the storing logic is further configured to:
generate a delta time value based on a difference in timestamps corresponding to the current value and the previously collected value; and
store the delta time value in the record.

10. The system of claim 9, wherein the storing logic is further configured to:
derive a value of the parameter for an earlier time based on the stored parameter value, stored delta value, and stored delta time value; and
present the derived value in a report that present parameter values at different times.

11. The system of claim 7, wherein the parameter comprises a string value and the storing logic is configured to:
determine whether the current value of the parameter has changed comprises comparing a numeric checksum value calculated based on the current string value of the parameter to a numeric checksum value generated for a previously collected string value of the parameter.

12. The system of claim 11, wherein:
the data collected from the one or more network devices comprises parameters having string values and parameters having numeric values; and
the storing logic is configured to store records including current values of parameter having string values and current values of parameters having numeric values in a common database table.

13. The system of claim 9, further comprising:
logic for generating a report based on values for the parameter contained in stored records and values derived for the parameter for time periods with no corresponding records because the parameter value did not change.

14. The system of claim 13, wherein the logic for generating the report is configured to derive values for the parameter for time periods with no corresponding records comprises deriving values based on a stored value of the parameter and a stored delta value.

15. A system, comprising:
means for storing records of data values of at least one parameter collected from one or more devices in a network, the records comprising a field for storing current numeric values collected for one or more parameters, a field for storing current string values collected for one or more parameters, and a field for storing a data type indicating whether a corresponding parameter value is a string value or a numeric value; and
means for determining whether the current value of the parameter has changed relative to a previously collected value for the parameter, discarding the current value without storing a record upon determining that the current value of the parameter has not changed, and, upon determining that the current value of the parameter has changed:
generating a delta value indicative of how much the parameter has changed over a time period since collecting the previously collected value, wherein the delta value is calculated by dividing a difference between the current value and the previously collected value by an amount of time elapsed since collecting the previously collected value; and
storing a record including at least the current value, the delta value, and an indication of whether the parameter value is a string value or a numeric value, storing the current value in a numeric data field of the record if the parameter has a numeric data type, and, if the parameter has a string data type, generating a checksum for the current string value of the parameter and storing the checksum in the numeric data field of the record.

16. The system of claim 15, wherein:
the means for determining whether the current value of the parameter have changed relative to previously collected values for the parameters is configured to, for a parameter having a string value, compare a checksum calculated for a current string value of the parameter to a checksum calculated for a previously collected string value of the parameter value.

17. The system of claim 16, wherein the means for determining whether the current value of the parameters have changed relative to previously collected values for the parameters is further configured to, if the comparison of checksums indicates the parameter value has changed, store the checksum calculated for the current string value of the parameter in a record with the current string value.

18. The system of claim 17, wherein the checksum calculated for the current string value is stored in a record field used to store numeric values of parameters having numeric values.

* * * * *